United States Patent [19]

Thiele

[11] Patent Number: 4,675,542
[45] Date of Patent: Jun. 23, 1987

[54] CIRCUIT ARRANGEMENT FOR MONITORING A THYRISTOR

[75] Inventor: Gerd Thiele, Erlangen, Fed. Rep. of Germany

[73] Assignee: Siemens Aktiengesellschaft, Berlin and Munich, Fed. Rep. of Germany

[21] Appl. No.: 742,804

[22] Filed: Jun. 10, 1985

[30] Foreign Application Priority Data

Jul. 17, 1984 [DE] Fed. Rep. of Germany ....... 3426767

[51] Int. Cl.$^4$ ............................................. H03K 17/72
[52] U.S. Cl. .................................. 307/252 N; 307/311
[58] Field of Search ......... 307/252 H, 252 N, 242 W, 307/252 VA, 311

[56] References Cited

U.S. PATENT DOCUMENTS 3,961,204  6/1976  Leowald et al. ............ 307/252 UA
4,151,427  4/1979  Travin ............................ 307/252 N
4,229,669  10/1980  Smith ................................... 307/311

Primary Examiner—John Zazworsky
Attorney, Agent, or Firm—Kenyon & Kenyon

[57] ABSTRACT

Disclosed is a circuit arrangement for monitoring a thyristor via a signal transmitting device which is connected on its input side in shunt with the thyristor and to the output of which a light emitting diode is connected for sending light signals to an evaluating device. To obtain a particularly simple and therefore operationally reliable design of such a circuit arrangement, and to achieve the emission of light signals with particularly high light output, the signal transmitting device contains a rectifier arrangement followed by an integrating stage, followed in turn by a threshold voltage switch which changes to a current-conducting state as soon as the voltage drop across it exceeds a predetermined threshold value. No separate power supply is required.

10 Claims, 2 Drawing Figures

CIRCUIT ARRANGEMENT FOR MONITORING A THYRISTOR

FIELD OF THE INNVENTION

The invention relates to a circuit arrangement for monitoring a thyristor via a signal transmitting device which is connected on its input side in shunt with the thyristor, and on its output side to a light emitting diode for sending light signals to an evaluating device.

BACKGROUND OF THE INVENTION

A known circuit arrangement for monitoring the state of a thyristor is shown in "etz", No. 25, Vol. 102, December 1981, on page 1341f in FIG. 7. The known circuit arrangement forms an integral part of the circuitry which is otherwise associated with the thyristor. The circuitry has a power supply of its own for supplying it with current from an auxiliary power output circuit which is connected in series with a damping resistor and a damping capacitor parallel to the thyristor. For monitoring the thyristor, the circuitry contains a signal transmitting device having an ohmic voltage divider connected in parallel to the thyristor. The tap of the voltage divider is connected to a signal processing circuit and then to a light emitting diode which emits light signals when addressed. The light signals are transmitted to an evaluating device via a light guide.

SUMMARY OF THE INVENTION

It is an object of the invention to propose a circuit arrangement for monitoring a thyristor, which arrangement is of particularly simple design and therefore operationally reliable because a separate power supply circuit is dispensed with, and makes possible the emission of light signals with a particularly high light output.

To solve this problem, the signal transmitting device of the type mentioned at the outset contains, according to the invention, a rectifier arrangement followed by an integrating stage; between the output of the integrating stage and the output of the signal transmitting device is connected a threshold voltage switch which is switched into a current-conducting state as soon as the voltage drop across it exceeds a predetermined threshold value.

The thyristor is monitored by the transmission of a light signal to the evaluating device when the thyristor is in the nonconducting state (cut off, blocking). An advantage of the circuit arrangement according to the invention is that in the nonconducting state of the thyristor, the voltage across it is used to drive the light emitting diode. The voltage across the thyristor is fed to the light emitting diode via the rectifier arrangement, the integrating stage and the threshold voltage switch. A separate power supply circuit for supplying current to the circuit arrangement according to the invention is therefore not necessary. By directly using the voltage across the thyristor, light signals with particularly large light output can be generated by the light emitting diode, so that less expensive light guides with relatively high attenuation can be used for transmitting the light signals to the evaluating device.

Together with the threshold voltage switch, the integrating stage advantageously prevents the light emitting diode from outputting a signal if voltage steps happen to occur across the thyristor when it is already in its conducting state, because the light emitting diode is driven only if the voltage at the output of the integrating stage exceeds the predetermined threshold value of the threshold voltage switch.

A particularly high light output of the signals emitted by the light emitting diode is achieved if the integrating stage consists of a resistor and a storage capacitor connected in series, and the terminals of the capacitor form the output of the integrating stage. In this arrangement, if the voltage at the storage capacitor exceeds the predetermined threshold value of the threshold voltage switch, all the energy stored in the capicitor is available to cause a large discharge current to flow through the light emitting diode for generating a light signal of high light output.

The thyristor is generally arranged in an installation operated with a-c current; it is of advantage here if the storage capacitor and the resistance of the integrating stage are designed so that the charging time for charging the storage capacitor to a voltage corresponding to the threshold voltage equals about one-third to one-half of the period of the a-c voltage. In this manner a signal-transmitting device is obtained which is insensitive to voltage jumps across the thyristor when the thyristor is not conducting, and an incorrect drive of the light emitting diode is prevented.

In one advantageous embodiment of the curcuit arrangement according to the invention, the threshold voltage switch is a sweep voltage switch which changes from a conducting state to a cut off state only if the current flowing through it falls below a minimum value.

It is particularly advantageous if the resistance of the integrating stage is designed so that, with the thyristor not conducting, the current through the threshold voltage switch is larger than the predetermined minimum value. The light emitting diode thereby remains lighted as long as the thyristor remains nonconducting. Only when the thyristor is changed again to a conducting state does the current through the threshold voltage switch fall below the predetermined mimimum value, so that the threshold voltage switch flips again into a current-blocking state.

DETAILED DESCRIPTION

Figure 1:
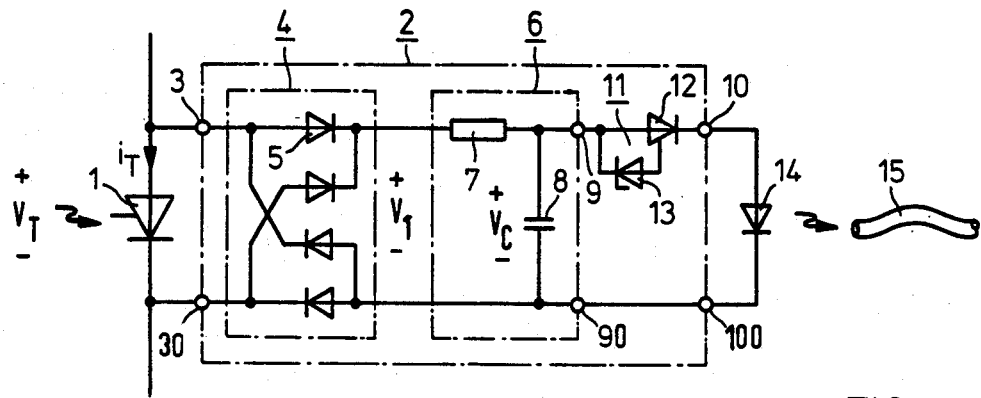
FIG. 1 shows a preferred embodiment example of a circuit arrangement according to the invention.
Figure 2:
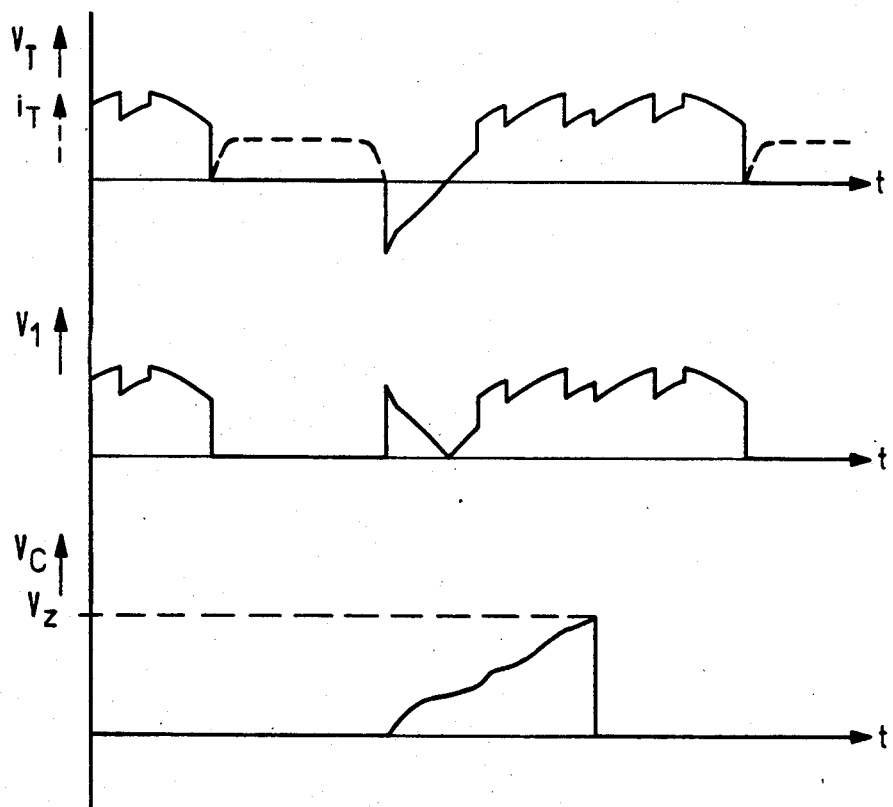
FIG. 2 shows a diagram of current and voltage waveforms for the circuit of FIG. 1.

FIG. 1 shows a thyristor to be monitored which may be arranged, for instance, together with further thyristors, in a valve branch of a converter arrangement. The thyristor 1 may be a thyristor which can be fired electrically or, according to the presentation in FIG. 1, by light. Connected in shunt with the thyristor 1 is a signal transmitting device 2 which is oonnected with its input terminals 3 and 30 to the anode and cathode terminals of the thyristor 1, respectively. The signal transmitting device 2 contains a rectifier arrangement 4 which consists of four diodes 5 arranged to form a full-wave bridge rectifier. The rectifier arrangement 4 is connected on its input side to the input terminals 3 and 30 of the signal transmitting device 2 and on its output side to an integrating stage 6. The integrating stage 6 consists of a resistor 7 and a storage capacitor 8 connected in series. The terminals of the capacitor 8 constitute the outputs 9 and 90 of the integrating stage 6. Between the outputs 9 and 90 of the integrating stage 6 and the outputs 10 and 100 of the signal transmitting device 2, a threshold voltage switch 11 is inserted in series. In the embodiment shown, the threshold voltage switch 11 is a sweep voltage switch and consists of an auxiliary thyristor 12, between the anode terminal and the gate terminal of whioh is connected a Zener diode 13. The threshold voltage of the threshold voltage switch 11 corresponds to the Zener voltage of its Zener diode 13. In a modification of the embodiment example shown, the threshold voltage switch can instead consist of a flip-flop diode (break-over diode), a unijunction transistor or of only a Zener diode. To the outputs 10 and 100 of the signal transmitting device 2, a light emitting diode 14 is connected which may, for instance, be an infrared light emitting diode. The light emitting diode 14 is optically coupled to one end of a light guide 15, the other end of the light guide 15 being connected to an evaluating device, not shown, for determining the state of the thyristor and for using it in, for example, a control circuit.

For explaining the operation of the embodiment example of the circuit arrangement according to the invention shown in FIG. 1, the waveform of the voltage $v_T$ across the thyristor 1, the current $i_T$ through the thyristor 1, the voltage $v_1$ at the output of the rectifier arrangement 4 and the voltage $v_c$ across at the outputs 9 and 90 of the integrating stage 6 are shown, all as a function of the time t. The waveforms of the voltages and the current shown are obtained for the case that the thyristor shown in FIG. 1 forms a valve element of a converter system working in inverter operation, not shown here. As long as the thyristor 1 is in a conducting state, the current $i_T$ flows through the thyristor 1 and the value of the voltage $v_T$ across it is nearly zero. Similarly, the voltages $v_1$ at the output of the rectifier arrangment 4 and $v_c$ across the outputs 9 and 90 of the integrator stage 6 always have the value zero, so that no current flows through the light emitting diode 14. As soon as the thyristor 1 changes to a cutoff state, the voltage $v_T$ across the thyristor 1 assumes a waveform different from zero until, with the voltage $v_T$ in the forward direction of the thyristor 1 being positive, the latter is fired and changes back into a conducting state. During the nonconducting state of the thyristor 1, a voltage $v_1$ is generated at the output of the rectifier arrangement 4 by rectification of the voltage $v_T$. The voltage $v_1$ charges the capacitor 8 of the integrating stage 6 via its resistor 7. The storage capacitor 8 is designed so that its charging time, until the voltage $v_c$ across the storage capacitor 8 reaches the value of the Zener voltage $V_z$ of the Zener diode 13, corresponds to about one-third to one-half the period of the a-c voltage with which the converter system is operated and in which the thyristor 1 is situated. As soon as the voltage $v_c$ across the storage capacitor 8 reaches the value of the Zener voltage $V_z$ of the Zener diode 13, the former causes the auxiliary thyristor 12 to fire. The storage capacitor 8 is then discharged via the auxiliary thyristor 12 and the light emitting diode 14. A very large pulse-shaped discharge current flows, resulting in a light signal with a correspondingly high light output. The resistor 7 of the integrating stage 6 is designed so that after the discharge of the storage capacitor 8 during the nonconducting stage of the thyristor 1, a residual current continues to flow through the auxiliary thyristor 12 which is larger than the minimum value of the threshold voltage switch 11 corresponding to the holding current of the auxiliary thyristor 12. The auxiliary thyristor 12 therefore remains conducting during the extended nonconducting state of the thyristor 1 and the capacitor 8 is prevented from being recharged and discharged again via the light emitting diode 14.

The invention has been described with respect to a particular embodiment thereof, and it will be understood that numerous modifications are possible without departing from the scope of the invention.

What is claimed is:

1. A signal transmitting device for transmitting an optical signal indicating the state of a subject thyristor, comprising:
    a pair of input terminals connectable across the subject thyristor;
    a pair of output terminals connectable across a light emitting diode;
    a rectifier connected to the input terminals;
    an integrator connected to the rectifier; and
    a threshold voltage for permitting current to reach the output only when the volltage output of the integrator exceeds a first predetermined value, said switch comprising means for blocking further current flow therethrough if the current flow therethrough falls below a second predetermined value.

2. A signal transmitting device according to claim 1, wherein the integrator comprises a series resistor followed by a shunt capacitor.

3. A signal transmitting device according to claim 2, wherein the subject thyristor is connectable to a circuit capable of generating an AC voltage across the subject thyristor, and wherein the resistor and capacitor are such that the period required for charging the capacitor to a voltage corresponding to the first predetermined value is between about one-third and about one-half of the period of the AC voltage.

4. A signal transmitting device according to claim 2, wherein the threshold voltage switch comprises means for blocking further current flow therethrough if the current flow therethrough falls below a second predetermined value.

5. A signal transmitting device according to claim 3, wherein the threshold voltage switch comprises means for blocking further current flow therethrough if the current flow therethrough falls below a second predetermined value.

6. A signal transmitting device according to claim 4, wherein the resistor is such that the current flow through the means for blocking exceeds the second predetermined value when the subject thyristor is in its nonconducting state.

7. A signal transmitting device according to claim 5, wherein the resistor is such that the current flow through the means for blocking exceeds the second predetermined value when the subject thyristor is in its nonconducting state.

8. A signal transmitting device according to claim 1, wherein the threshold voltage switch comprises a series-connected auxiliary thyristor and a Zener diode connected across the anode and gate of the auxiliary thyristor.

9. A signal transmitting device according to claim 2, wherein the threshold voltage switch comprises a series-connected auxiliary thyristor and a Zener diode connected across the anode and gate of the auxiliary thyristor.

10. A signal transmitting device according to claim 3, wherein the threshold voltage switch comprises a series-connected auxiliary thyristor and a Zener diode connected across the anode and gate of the auxiliary thyristor.

* * * * *